United States Patent

[11] 3,568,663

| [72] | Inventor | Clifford G. Phipps<br>Newbury Park, Calif. |
|---|---|---|
| [21] | Appl. No. | 786,130 |
| [22] | Filed | Dec. 23, 1968 |
| [45] | Patented | Mar. 9, 1971 |
| [73] | Assignee | The United States of America as represented by the Secretary of the Navy |

[54] PHYSIOLOGICAL DATA ACQUISITION SYSTEM
2 Claims, 6 Drawing Figs.

[52] U.S. Cl............................................... 128/2.06
[51] Int. Cl............................................... A61b 5/04
[50] Field of Search................................... 128/2.05
(AS), 2.06, 2.1, (Pickup Electrode Digest), 404, 418

[56] References Cited
UNITED STATES PATENTS
2,660,175  11/1953  Thrasher et al............... 128/404

3,326,207  6/1967  Egan ........................... 128/2.06
3,349,763  10/1967  Clements, Jr., et al. ...... 128/2.05(MS)
3,367,323  2/1968  Schuler ........................ 128/2.06

Primary Examiner—William E. Kamm
Attorneys—Edgar J. Brower, Q. Baxter Warner and Howard J. Murray, Jr.

ABSTRACT: Apparatus for facilitating the rapid acquisition of bioelectric physiological data from aquatic mammals without requiring the use of engirdling straps or time consuming preparational procedures. A feature of the disclosure is the employment of a plurality of electrodes respectively disposed within flexible cups connected to a vacuum system, the action of the latter serving to establish and maintain tight physical engagement between each of the electrodes and the tissue of the mammal being tested. Inaccuracies in the derived data due to slight electrode displacements, common with conventional apparatus, are thus prevented.

PHYSIOLOGICAL DATA ACQUISITION SYSTEM

BACKGROUND OF THE INVENTION

The instrumentation of aquatic mammals in order to obtain physiological data therefrom is becoming of increasing importance. However, equipment presently being used is for the most part the readily-available medical apparatus found in a typical doctor's office or hospital. These items are obviously designed to be compatible with human requirements with respect to anatomy, physiological function and normal habitat. Aquatic mammals, although fundamentally similar air-breathing creatures, differ not only in anatomy and habitat but also in many of their physiological characteristics. These differences make the application of standard medical instrumentation to aquatic mammals less than adequate in many respects. As an example, the standard clinical electrocardiograph employs electrodes attached to the body appendages, such for example, as the arms or legs. This permits simple engirdling strap attachment of electrodes, plus a certain standardization of bioelectric field intercept. The aquatic mammal, although retaining remnant structures (such, for example, as the pectoral flipper) and remnant landmarks equivalent to man's appendages, does not lend itself to the same type of electrode attachment. This will be appreciated when it is considered that a porpoise flipper is not circular in cross section and will undergo dimensional distortion if engirdled by a strap under tension. This distortion introduces possible discomfort (phychological feedback), potential tissue damage, and, in any event, a loose and generally unacceptable electrode relationship.

Another example illustrating the above lies in the procedure by means of which brain waves are acquired. The forward portion of the porpoise is intrinsically conical in shape, with some truncation. The brain lobes are situated inside this general configuration. The electric fields generated by the brain thus appear as voltage gradients on external surfaces which are neither cylindrical nor symmetrical in shape. Consequently, engirdling straps for holding these electrodes in place are for the most part ineffective. Passive vacuum cup attachments are also unsuitable due to the irregular nonplanar surfaces which cause leakage of vacuum. Adhesive-type electrodes are impractical because of the water environment, toxicity and the considerable time required for their application.

A final example to bring out the inadequacy of strap-attached electrodes involves consideration of the respiratory function of the mammal. A porpoise does not exhibit the smooth, rhythmical, somewhat sinusoidal nature of human breathing. Instead, the porpoise breathing cycle includes a long period of quiescence, or nonbreathing, and then a sudden transientlike exhalation and inhalation. This abrupt gaseous exchange is accompanied by a circumferential alteration of the porpoise body. This dimensional variation creates dynamic tensional forces in the engirdling straps, with slight movement of the electrodes resulting. This brings about concomitant changes in the electrical relationships at the electrode-tissue interface.

Secondary disadvantages also accrue from the use of standard plate electrodes. The electrolytic gels which are rubbed into the tissue surface to improve the electrically conductive characteristics of the electrode contact are washed away when exposed plate electrodes are employed, and water application to the mammal is usually requisite to maintaining a suitable thermal exchange (temperature control) and possible subjective stability. Transient electrical activity occurs when the applied water strikes the electrode, possibly due to the multiple grounding paths provided by the body of the mammal. Still further, it has been found that when hairy aquatic mammals (such as sea lions) are instrumented for bioelectric readout, it is a practical impossibility to attach a passive vacuum cup in such a manner that no leakage occurs, since the hairy surface of the mammal is not conducive to proper seating of the cup.

The foregoing discussion indicates that the passive vacuum cup provides a solution for only a few of the problems which arise from strap attachments. Slow leakage through the vacuum seal makes the use of such passive vacuum cups unacceptable in many bioelectrical data acquisition systems.

Another factor to be considered in the acquisition of physiological data from aquatic mammals is the necessity for proper calibration of the information obtained. Normally this calibration consists of a pulse of known amplitude applied during the isoelectric phase of the derived waveform (such, for example, as an electrocardiogram). On a human being this is not too difficult to accomplish by visually monitoring the displayed or recorded trace and manually injecting the pulse so as to place it in the isoelectric phase of the ECG signature. However, on some aquatic mammals, such as the porpoise, the heart rate varies somewhat as a function of the respiratory cycle, and calibration pulse placement on the isoelectric portion is a more difficult task.

SUMMARY OF THE INVENTION

The present concept relates to a system for obtaining accurate physiological data from aquatic mammals through the use of an electrode tightly held against a mammal's skin by a suction cup, the suction being maintained by connecting the cup to a vacuum pump by means of a tube which passes through an accumulator acting to smooth out the vacuum pump pulses. In addition, means are provided for enabling an accurate calibration of the output data and for permitting a pretest checkout of the resistance characteristics of the entire system.

OBJECTS OF THE INVENTION

One object of the present invention, therefore, is to provide an improved system for obtaining accurate physiological data from aquatic mammals.

A further object of the present invention is to provide an electrode for use in obtaining physiological data from aquatic mammals, such electrode being tightly held against a mammal's skin by means of a suction cup connected to a vacuum pump.

An additional object of the present invention is to provide a bioelectric physiological data acquisition system in which one or more electrodes may be securely positioned on the tissue of an aquatic mammal without the necessity of employing engirdling straps or other attachments of such nature as to introduce the possibility of tissue damage with accompanying psychological feedback.

A still further object of the present invention is to provide a data acquisition system for aquatic mammals in which information as to a plurality of separate physiological functions may be selectively displayed on an oscilloscope or other readout device.

Other objects, advantages, and novel features of the invention will become apparent from the following detailed description of the invention when considered in conjunction with the accompanying drawings.

DESCRIPTION OF THE PREFERRED EMBODIMENT

Figure 1:
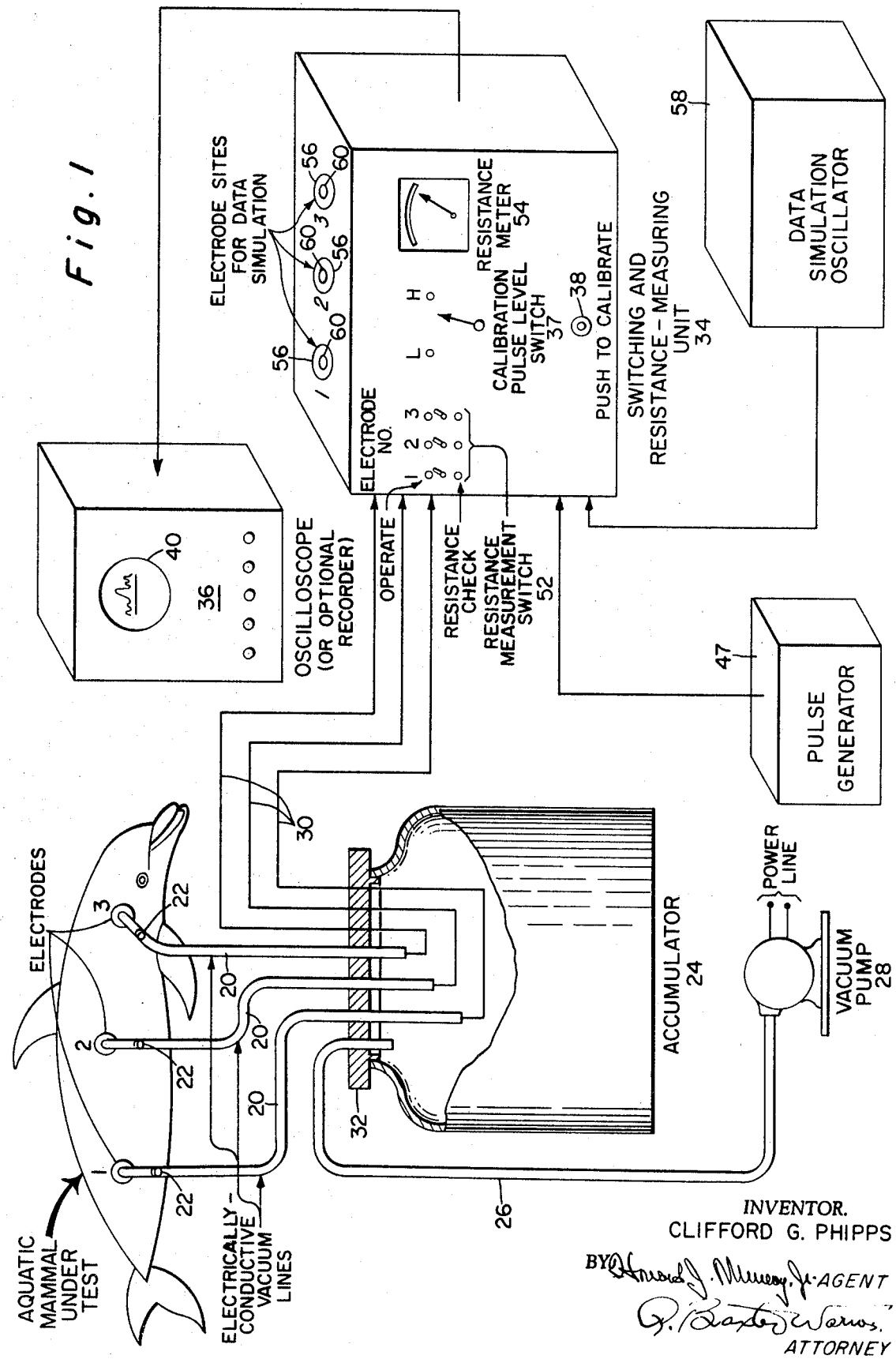
FIG. 1 is a partly schematic showing of a bioelectric physiological data acquisition system designed in accordance with a preferred embodiment of the present invention.

In FIG. 1 of the drawings is shown a bioelectric data acquisition system especially useful in investigating physiological functions of an aquatic mammal, such for example as a porpoise or a sea lion. In conducting such an investigation, one or more electrodes are attached at appropriate locations on the skin or tissue of the mammal under test, these components being designated in the drawing as electrodes 01, 02 and 03, respectively. However, the number of electrodes employed during any particular test will obviously depend at least in part upon the type of data being sought.

Before proceeding with a detailed description of the invention arrangement, it should be understood that the system is intended to perform two important functions: (1) to provide an electrode, or pickup device, designed to obtain from the mammal bioelectric data without distortion or loss in amplitude due to faulty interface relationships between the electrode per se and the skin or tissue of the mammal to which the electrode is attached, and (2) to process the data so derived and present it in a form suitable for evaluation and/or analysis. A description of the manner in which the present invention performs these functions will now be set forth.

Figure 2:
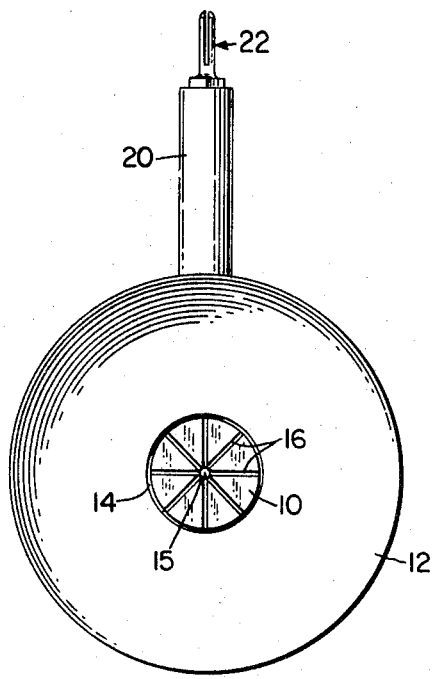
FIGS. 2 and 3 are front and back views, respectively, of a preferred form of vacuum cup electrode especially suitable for use in the system of FIG. 1.
Figure 4:
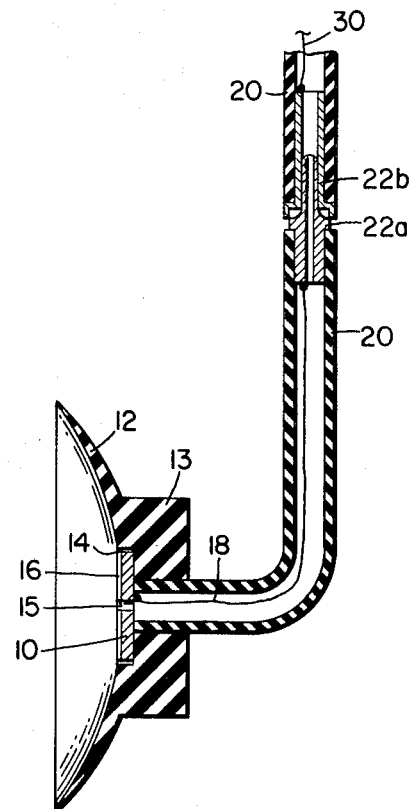
FIG. 4 is a sectional view of FIG. 3 taken along the line 4—4.
Figure 3:
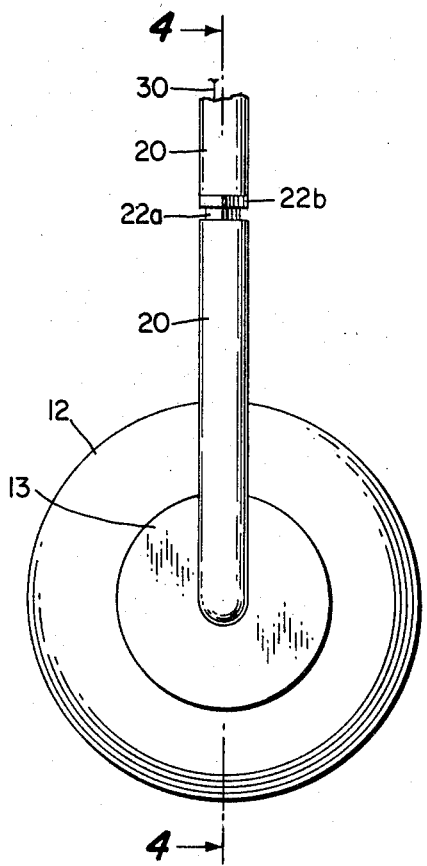

Considering first the construction of the electrodes per se, reference is made to FIGS. 2, 3 and 4 of the drawings. As best shown in FIGS. 2 and 4, the active portion of each such pickup member consists of an electrically conductive tablet 10 centrally disposed within a flexible cup 12 composed of some suitable material such as silicone rubber, one preferred substance being marketed by the General Electric Company under the designation RTV-615. This particular material is extremely pliable and conforms to a contacting surface with a high order of compliance. Furthermore, the cup when seated has very low mechanical prestressing from deformations and requires a low order of interior vacuum to maintain it adherent.

As shown in FIG. 4, the flexible cup 12 includes a base member 13 composed of the same flexible material as the remainder of the cup and preferably formed integrally therewith. The active electrode tablet 10 is receivable in a cutout recess 14 in this base member 13. The electrode has a central or axial opening 15 formed therein to allow air to be withdrawn from the interior of the cup-shaped member 12 when the latter is placed upon the skin or tissue of a mammal in the manner shown in FIG. 1 of the drawings. In addition, the inner surface of the electrode tablet 10 has a number of radially-extending grooves 16 (FIG. 2) formed therein which permit good suction of air therethrough and result in a very tight adherence of the tablet 10 to the skin of the mammal being tested when a vacuum condition is established in a manner to be described hereinafter.

The electrically conductive tablet 10 is attached to an electrical conductor such as the wire 18 by some means such as soldering, this wire 18 lying within a vacuum line 20 which may be a section of surgical hose. The cup 12 and a small length of the line 20 (about 3 inches is preferable) form a module (FIGS. 2 and 3) which is terminated in a modified banana-type fitting 22 (FIG. 2). This fitting 22 is designed to allow transmission of both vacuum and electrical signals therethrough. The purpose of the modular design is to permit each cup to be detached from the remainder of the system of FIG. 1, and hence the versatility of the system is increased by permitting different configurations of cup modules to be utilized depending upon the specific bioelectric information desired.

Each vacuum line 20 shown in FIG. 1 of the drawings leads to the interior of an accumulator jar 24. A further vacuum line 26 leads from the interior of this jar to a vacuum pump 28 which, when energized, creates a desired low-pressure condition within the accumulator jar 24. This relative low pressure within the jar 24 is transmitted through the lines 20 to the respective electrode cups 12 so as to maintain the electrodes therewithin securely pressed against the skin or tissues of the mammal under test. It should be noted that the accumulator 24 not only serves to smooth out variations in pressure resulting from the action of pump 28, but also serves to trap any water which may be sucked into the vacuum cups 12 during testing of a mammal and which could cause corrosion of the pump mechanism unless prevented from reaching the latter.

In order to more fully bring out the advantages provided by the apparatus of the present disclosure, a more detailed description of the electrodes per se will be given. This is especially important, inasmuch as it has been found that no amount of amplification can overcome the errors and ambiguities introduced by the use of an unsatisfactory transducing device.

Thorough investigation has disclosed that the optimum design incorporates the metallic tablet 10 which is recessed into the underside of the silicone rubber cup 12. This tablet, a preferred material for which is silver or silver chloride, is drilled through its center to form a vacuum relief passage about 2 millimeters in diameter and having a total depth of approximately 4 millimeters. The open face of the tablet is also grooved radially as shown in FIG. 2, these radial grooves being spaced apart at an angle of approximately 45° and cut to a depth of about 1 millimeter. As shown in FIG. 2, such grooves converge at the center of the vacuum relief opening 15, and, consequently, produce a very effective vacuum distribution system for withdrawing air from the interior of the cup 12 when the system of FIG. 1 is in use.

The above design of the electrode creates in effect an interlocking of mammal tissue with the face of the conductive tablet 10, this interlocking acting to firmly hold the tablet in place upon the tissue and effectively increasing the degree of contact therebetween. A short electrical conductor (18 in FIG. 4) is connected to the tablet and carries the bioelectric signal approximately 3 inches to one element 22a of the fitting 22 which terminates the signal path in the cup module. This component of the fitting 22 (a male "banana"-type member) connects to a female fitting member 22b at the end of the vacuum line 20 the latter in turn being soldered or otherwise affixed to a wire 30 which carries the signal through line 20 to the accumulator jar 24 and the electronic circuitry in a manner to be described. If desired, conduction of the signal through line 20 may be effected by shielded "mininoise" cable, which has extremely low noise characteristics and incorporates powdered silver impregnated in a copper shielding braid. The length of the lines 20 between the electrodes and the accumulator jar 24 should be as short as possible, and is approximately 8 feet in a system now in use.

The accumulator jar may be a heavy glass reagent jar fitted with a neoprene stopper 32. The stopper is pierced by the three vacuum lines 20 and by the further vacuum line 26 leading to the pump 28. The respective wires 30 within the vacuum lines 20 pass back up through the rubber stopper as illustrated and lead to the switching and resistance-measuring unit 34 shown in FIG. 1. If desired, nonpermanent connections between the respective portions of the wires 30 lying within vacuum lines 20 and the electrical leads to the unit 34 may be made within jar 24 to facilitate rapid troubleshooting and shorten the time required for repair or replacement of these components.

The unit 34 shown in FIG. 1 of the drawings includes at least one more or less conventional preamplifier having a signal gain of about 1,000, so that most bioelectric signals as applied from the unit 34 to an oscilloscope (or recorder) 36 have an amplitude of about 1 volt peak-to-peak. Preferably this preamplifier is of the balanced differential type for highest order inphase noise rejection and also to lend compatibility with the physiologic lead system. Preamplifiers are available with an input noise factor as low as 4 microvolts peak-to-peak over a band width of .5 hertz to 60 hertz. This extremely low noise factor permits the disclosed system to acquire very low amplitude (10 to 50 microvolts) brain wave bioelectric signals without obliteration or excessive masking by noise. The preamplifier should preferably be battery powered to eliminate the necessity for using rectifiers or filters such as would be required by employing an A.C. line input.

Figure 5:
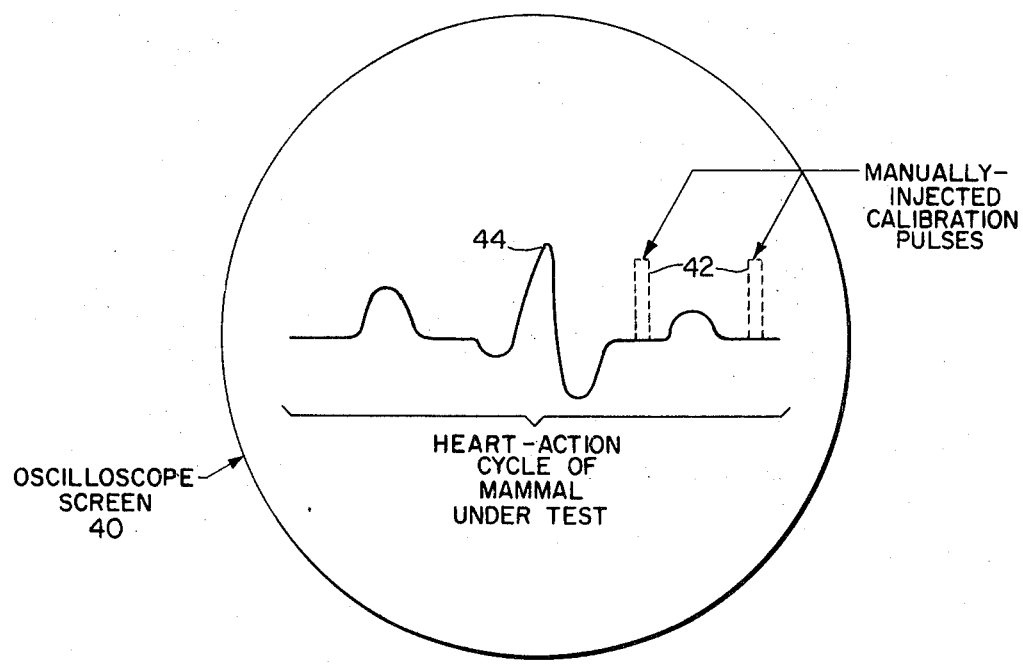
FIGS. 5 and 6 are views of the screen of the oscilloscope of FIG. 1, illustrating the manner in which various types of calibration pulses may be superimposed upon a waveform representing physiological data such as might be obtained during the testing of an aquatic mammal.

Accurate calibration of signal amplitude is generally considered to be a prime requisite of good data documentation. Especially in the development of vector cardiograms from scalar cardiograms, for example, amplitude information is essential. Brain wave signals (electroencephalograms) are also amplitude calibrated, but the brain signals are at a much lower order of magnitude (microvolts vs. millivolts) than heart bioelectric signals and require a lower level of calibration pulse to render them useful in the region of interest. The system of the present invention is designed to employ calibration pulses of a certain amplitude (say 200 microvolts) for use with encephalograms and myograms (muscle activity) and of a higher amplitude (such for example as 1 millivolt) for use with electrocardiographic information. The particular level desired is selected by actuating the switch 37 on the front panel of the unit 34 of FIG. 1. Injection of this calibration pulse is accomplished manually by pressing the button 38, which introduces the pulse into the circuit so that it appears on the oscilloscope screen 40 in a manner illustrated by the reference numeral 42 in FIG. 5. This pulse may be generated by conventional circuitry located within the unit 34, such circuitry consisting, for example, of a .2 ohm resistor supplied with a current of 1 milliampere to produce a 200 microvolt IR drop thereacross. It is essential that the calibration pulse not be influenced by initial current/voltage conditions at the time of pulse generation. The effective internal resistance of the calibration unit as a voltage source (.2 ohms) should be very small with respect to the balance of the circuit, which might be in the neighborhood of 5,000 ohms. This favorable ratio results in no obvious disturbance to the data signal input at the time of pulse application. FIG. 5 of the drawings shows how the heart action cycle of a particular mammal being tested possesses a peak amplitude 44 which may be compared to the peak amplitude of the calibration pulses 42 so as to yield information as to a particular physiological condition of the mammal.

Figure 6:
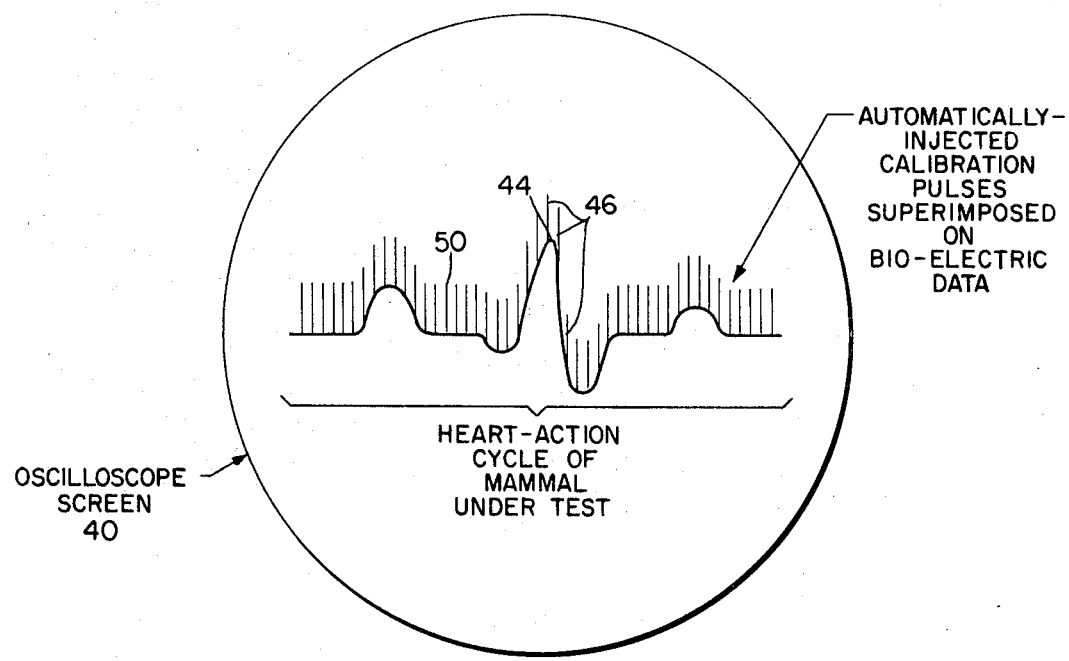

Although the process of manually injecting the calibration pulse by actuation of the button 38 is satisfactory under certain conditions, it has been found that in many cases it is advantageous to develop automatically a chain or series of pulses which can be superimposed upon the data waveform as shown in FIG. 6 of the drawings. These pulses, identified by the reference numeral 46 in FIG. 6, may be generated by any suitable circuit now known in the art, and merely added to the data waveform appearing in the output of the unit 34. The spacing between these pulses 46 is chosen so as not to obscure the data waveform, and consequently any particular peak portion (such as that illustrated in FIGS. 5 and 6 by the reference numeral 44) may directly be compared to the peak level of those calibration pulses 50 which occur during a linear or zero amplitude portion of the data waveform. No action on the part of the operator is thus necessary to cause these pulses 46 to appear on the oscilloscope screen. Since circuitry for generating such a pulse series may be conventional in every respect, such means has been illustrated solely by the unit 47 in FIG. 1 of the drawings. However, the manner in which such pulses can be made to appear on the screen of the oscilloscope 36 will be immediately apparent to those skilled in the art.

In systems of the type being described it is also highly desirable to provide some means for periodically checking the resistance of the pickup portion of the electrical network. This will be recognized when it is considered that maximum utilization of available time is essential when a mammal is being tested in an environment other than that in which it is normally found. When the mammal is ill or undergoing a research objective, time is even more critical. Consequently very little opportunity is afforded for checking out the system after the electrodes have been attached to the mammal, and hence it is desirable to insure that the system is in operating condition before any test operations are conducted so that no malfunction will occur as a result of insecure electrode application, electrical interference, salt water contamination, broken leads due to the movement of the mammal, etc. In the present invention, means have been provided to obviate any such potential difficulties by providing a checkout somewhat similar to the "preflight" checkout systems associated with aircraft. However, before considering the details of the system, the following points should be borne in mind.

The bioelectric signal from any subject depends on a continuous circuit existing from wires leading from both sides of the differential signal connector at the amplifier back through a pair of electrodes and through the somatic section of the subject. In a three-electrode system consisting of two electrodes for the signal and one electrode for ground, measurement of the ohmic resistance of the three possible pair combinations (one at a time) will not only give quantitative values which correlate with certain levels of noise pickup, but will also determine the specific electrode or cable which is at fault. Knowledge of the conductive characteristics of each lead is therefore of highest importance. When seeking bioelectric signals with amplitudes in the region of 1 millivolt or less, a lead circuit resistance of 10,000 ohms (for example) could render the noise pickup level so high as to preclude acquisition of usable signal data. Noise abatement or rejection would increase as the 10,000 ohm reading were lowered to a figure of perhaps 500 to 800 ohms, which is considered the minimum practicable. It is therefore obvious that instantaneous readout of the ohmic value of the transducing components is a valuable tool. If lead assessment as described is performed and the calibration pulses are developed at readout, the data system must necessarily be performing in a satisfactory manner.

In order to obtain resistance measurements of the type mentioned above, each of the electrical conductors 30 leading to the unit 34 from the accumulator 24 terminates in one of the toggle elements of a resistance-measurement switch 52 located in the front panel of the unit 34. Each toggle element is associated with one of the electrodes identified as numbers 1, 2 and 3 in the upper left-hand portion of FIG. 1 of the drawings, and is preferably color-coded for ready identification with its respective electrode. Each toggle element is of the double-throw, center-off type. The upper toggle position connects the electrode through the switch to the amplifier contained within unit 34 during the "operation" phase, while the lower toggle position connects the electrodes to the resistance-measuring circuitry contained within unit 34. The center "off" position isolates the electrode and its respective conductor 30 from the remainder of the system. Due to the color-coding of the respective units, a given electrode attached to the mammal under test can immediately be correlated or identified as an electrical function on the panel of unit 34 for the application of testing procedures.

Testing of any one electrode circuitry by manipulation the proper toggle element of switch 52 to its lower or checking position produces a resistance reading on a meter 54, which may, for example, be a 50 microampere meter with an overwritten scale requiring a multiplier of 1,000 in order to read out in ohms. For accurate measurements, the current is allowed to flow in the resistance-measuring circuit for only a few seconds in one direction while a quick reading is obtained. The reason for this is that during current flow the mode of electrical conduction changes from electronic to ionic (or vice versa) at the electrode-tissue interface of each electrode attached to the mammal under test. As in any device, certain gases or charged particles tend to collect at one pole (such as the pole of a battery) until a polarizing action occurs which can result in an increase in effective junction or transformation resistance. To reduce the effects of this condition, a low circuit current is desirable, or incorporation of some means which permits periodic reversal of the current flow. It is within the scope of the present invention to embody such a current-flow-reversing means in the switching and resistance measuring unit 34 if such circuitry should prove desirable.

The top panel of the switching and resistance measuring unit 34 is provided with three electrode sites employed for measuring resistance in the manner above set forth. The number of sites thus provided is obviously equal to the number of electrodes present in the particular system used. These electrodes sites, identified in FIG. 1 of the drawings by the reference numeral 56 enable a "one-shot" comprehensive test to be made of the total system of FIG. 1 prior to connection of the electrodes to the aquatic mammal to be tested. This has the effect of forestalling the necessity for checkout operations after the test mammal is so instrumented, and, in effect, indicates a system "go" status. This is accomplished by simulating a data signal by means of a conventional sine wave oscillator 58 which feeds an input to the switching and resistance unit 34 of FIG. 1 which signal, after a desired degree of attenuation to bring it into the range lying between a few microvolts up to a maximum of 3 millivolts, is applied to the oscilloscope 36 to appear upon the screen 40 thereof, or, alternatively, is supplied to some suitable recording unit so that a printed record made thereby may be evaluated to establish the status of the invention system. In other words, the applied sinusoidal signal yields a check on the overall system with respect to noise, gain, etc. before the mammal is introduced into the system as a "real" input.

The electrode sites 56 provided on the top cover of the switching and resistance measuring unit 34 are merely color-coded rings of material cemented to the surface of the top cover and concentric with insulated contacts 60. These contacts 60 are attached in heremetic fashion so that the vacuum cups of the electrodes will adhere to the respective electrode sites. At the same time that this electrical data simulation is carried out, the vacuum system including the accumulator 24 and the vacuum lines 20 can be checked for evidence of leaks, strength of vacuum cup action, etc.

It will now be recognized that the electrodes disclosed in the present application possess a number of advantages heretofore unobtainable in devices of this nature. Such advantages include the speed with which such electrodes can be applied to the skin or tissue of a mammal without the necessity of utilizing engirdling straps or gum adhesives, while remaining in place idefinitely even on hair-covered skin or on irregular surfaces such as the mammal's flippers. In addition, the active vacuum feature will reseal a jerked or partially displaced electrode. Still further, the electrodes do not erode the skin of the mammal under test, and will withstand a stream of cooling water which often must be employed during the testing of an aquatic mammal. As to the system itself, the entire assembly can be rapidly checked out both as to its electrical and physical features, and the injection of calibration pulses has the effect of permitting almost instantaneous evaluation of the data signal as either displayed or recorded. The use of electrically conductive vacuum lines minimizes the number of parts required for separate transmission, and hence reduces the encumbrance of the test site. The modular design facilitates repair or replacement of parts, while the resistance-checking feature enables a so-called "preflight" test to be made of the system before actual operation thereof in initiated, since the oscilloscope display can not be depended upon to assess merit or quality of electrode attachment. For example, when attempting to acquire brain waves, easily recognizable signatures are not always present, and hence no proof of proper electrodes contact is available. The only solution is a resistance check of the somatic lead segment along the lines set forth above. This procedure absolutely identifies an electrode (or electrodes) which may be improperly seated, and requires a minimum of time for the checking process to be carried out.

I claim:

1. In a system for the acquisition of bioelectric physiological data from mammals, said system including a transducer designed for positioning in physical contact with the skin or tissue of a mammal from which such data is to be acquired, the improvement which comprises:
    means for precluding the introduction of irregularities into the data so acquired as a result of an improper transducer-skin interface relationship during the acquisition period, said means including:
    a cup-shaped member of flexible material intended to be compressed against the skin or tissue of a mammal and, when so compressed to form a substantially airtight seal around the periphery thereof;
    an electrode enclosed within said cup-shaped member and designed to contact the skin or tissue of said mammal when said member is compressed; and
    means connected to said cup-shaped member for maintaining said electrode in contact with the skin or tissue of said mammal under conditions wherein leakage of air occurs through said seal;
    said means connected to said cup-shaped member for maintaining said electrode in contact with the skin or tissue of said mammal including a source of vacuum and means for connecting said vacuum source to the interior of said cup-shaped member;
    said electrode being in the general shape of a tablet having a planar surface designed to contact the skin or tissue of said mammal, said tablet having an opening therein generally normal to said planar surface, said opening forming part of said means for connecting said vacuum source to the interior of said cup-shaped member;
    the planar surface of said tablet having a plurality of grooves formed therein extending radially outwardly from said opening, each of said grooves being designed to conduct therethrough to said opening air which has leaked through said seal when the surface of said tablet is contacting the skin or tissue of said mammal.

2. In a system for the acquisition of bioelectric physiological data from mammals, said system including:
    a transducer designed for positioning in physical contact with the skin or tissues of a mammal from which such data is to be acquired;
    means for forming a substantially airtight seal around said transducer when the latter is in physical contact with the skin or tissue of a mammal from which data is to be acquired;
    means for establishing and maintaining a partial vacuum within said last-mentioned means regardless of any leakage of air which may occur through said seal;
    a display device;
    means for electrically connecting said transducer to said display device so as to effect a visual presentation of the physiological data acquired from said manual;
    said means for establishing and maintaining a partial vacuum within said means for forming a substantially airtight seal around said transducer including a vacuum pump and a conduit for connecting said pump to said seal-forming means so that said pump is effective to withdraw air from within said seal-forming means;
    a source of calibration pulses;
    and means for injecting pulses from said source into said system so that such pulses are in effect superimposed on the physiological data visually presented on said display device.